United States Patent Office 3,512,411
Patented May 19, 1970

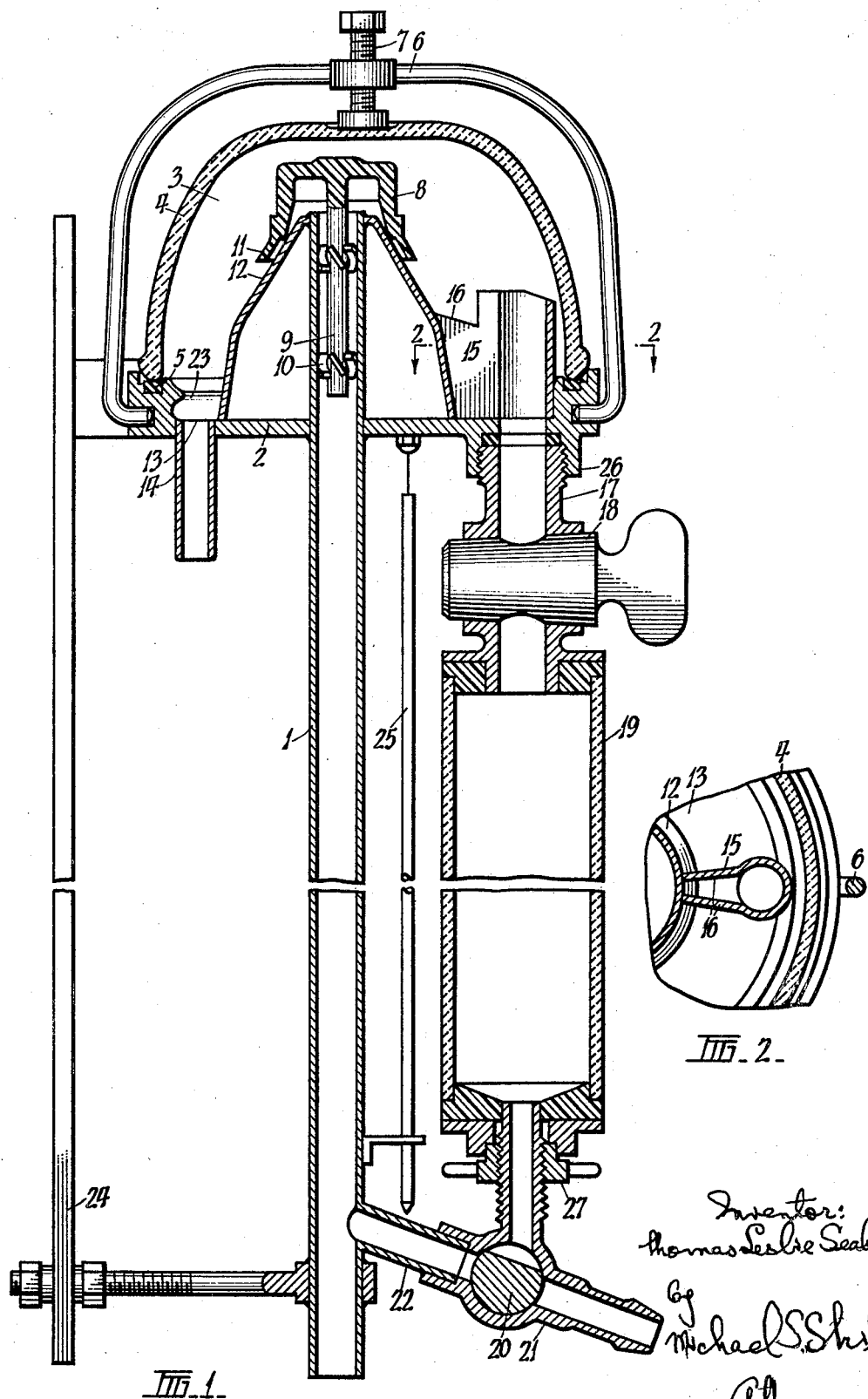

3,512,411
MILK METER FOR MILKING MACHINES
Thomas Leslie Seaborne, Corner of Lygon St. & Brunswick Road, East Brunswick, Victoria, Australia
Filed Nov. 9, 1967, Ser. No. 681,832
Int. Cl. G01f 5/00
U.S. Cl. 73—202     13 Claims

ABSTRACT OF THE DISCLOSURE

A measuring device for milking machines includes a base member which supports an inverted bowl. A milk inlet pipe extends through the base member upwardly into the interior of the bowl. A conical guide member is arranged within the bowl around the upper portion of the milk inlet pipe. A cap member is rotatable on the upper end of the inlet pipe so as to distribute incoming milk in a uniform descending curtain over the surface of the conical member. Wall means defines a sector-shaped chamber at the lower end of the conical member and serves to collect a fixed and known ratio or proportion of the milk descending over the circumferential surface of the conical member. Measuring means is provided for measuring the quantity of milk collecting in this chamber.

---

This invention relates to an improved milk meter for use with milking machines to indicate the total weight of milk obtained from individual cows being milked. More particularly, the improved meter is of the sampling type which withdraws a fixed ratio or proportion of the total milk flow in the form of a representative sample and indicates the total weight of milk therefrom. The sample, being a truly representative sample, can also be used for butterfat or other tests.

In accordance with the invention, the improved milk meter comprises a base member supporting a bowl, a milk inlet pipe extending upwardly into said bowl, a conical or like member arranged within the bowl around the milk inlet pipe, a cap rotatable on the upper end of the inlet pipe to distribute the milk in an uniform descending curtain over the surface of the conical member, a sector-like chamber at the lower end of the conical member collecting a fixed and known ratio or proportion of the milk descending the conical member and means for measuring the quantity of milk collected in said sector-like chamber.

The invention is more fully described and ascertained aided by reference to the accompanying drawings which illustrate the preferred embodiment. In these drawings:

FIG. 1 is a vertical sectional view of the complete milk meter.

FIG. 2 is a horizontal section on line 2—2 of FIG. 1.

As is shown in these views, the improved meter comprises a vertical inlet tube 1, the upper end of which passes through a base member 2 into a milk chamber 3 formed by a glass or other transparent bowl 4 clamped onto the base member. The base member 2 may have a rubber or like resilient sealing ring 5 against which the lower end of the bowl 4 is clamped, preferably by means of a clamping yoke 6 pivoted to the base member and a clamping screw 7 carried by said yoke and having a suitable bearing member engageable with the top of the bowl.

Arranged over the upper end of the inlet pipe 1 is a light cap 8, preferably made as a plastic moulding, having a downwardly extending stem 9 which is slidable in the upper end of the milk inlet pipe 1. Said stem has helical or inclined vanes 10 or the equivalent which cause the cap to be rotated under the flow of the incoming milk.

The cap 8 rises under the inflow of the milk and it has a lower edge or lip 11 to distribute the milk in an uniform descending curtain over the surface of a substantially conical or like member 12 arranged around the end of the inlet pipe 1 within the bowl 4. Most of the milk distributed onto the conical member 12 flows down it to the floor 13 of the chamber 3 and thence through a suitable outlet pipe 14 to the milk pipe of the milking machine. A small fixed and known ratio or proportion of the milk, however, is collected in a small sector-like chamber 15 between two closely spaced vertical walls 16 at the lower end of the conical member 12.

The representative sample of milk so collected passes through a tube 17 and a sampling cock 18 into a vertical glass or like transparent measuring cylinder 19. The tube 17 is preferably of sufficient diameter that movement of air to and from the measuring cylinder due to vacuum fluctuations in the meter do not cause the sample to be drawn back into the milk chamber 3.

The measuring cylinder 19 is preferably graduated to indicate the total weight of milk flow or the milk may be withdrawn through a suitable draw-off tap 20 and pipe 21 into a measuring flask or a sampling flask for butterfat or other testing. The draw-off tap 20 may also be constructed as to return the milk, after measuring in the cylinder 19, into a branch pipe 22 leading to the inlet pipe 1.

To accurately read the milk weight, the sampling cock 18 is first closed. The cock is preferably so constructed that, when turned to such position, it admits atmospheric air to the measuring cylinder 19. This assists in reducing the froth level and also permits free withdrawal of the milk from the measuring cylinder after measuring through the tap 20 as previously mentioned.

If withdrawal of milk for butterfat or other testing is required, the draw-off tap 20 is first slightly opened to atmosphere before the sampling cock 18 is closed. This causes air to be drawn into the meter stirring up the sample in the measuring cylinder 19 to prevent separation of the butterfat.

If the sample in the measuring cylinder is to be returned to the machine after reading the milk weight, the sampling cock 18 is closed and, after reading the weight, the draw-off tap 20 is opened to drain position connection to the pipe 22 allowing the sample to be drawn back into the machine through the branch pipe 22 connected to the inlet pipe 1. In this case, the sampling cock 18 should be returned to open position before the draw-off tap 20 is closed so that the small quantity of milk remaining is drawn away.

The bowl 4 of the milk chamber is preferably transparent so that the flow of milk down the conical member 12 is clearly visible. The arrangement is also preferably such that the cap 8 over the upper end of the inlet tube 1 will strike against the underside of the top of the bowl when it rises. The weight of the cap is preferably so adjusted that, when the flow of milk is in excess of say ½ lb. per minute, the cap rises sufficiently to lightly tap the bowl as it rotates giving an audible indication that milking rate of flow is taking place. Cessation of tapping can thus indicate that the milk flow has reached the end of milking. Thus, the milk meter can also act as a milking indicator since the flow of milk down the conical member 12 is clearly visible through the transparent bowl and the bowl remains clear as the milk does not flood the bowl but flows in an uniform curtain down the conical member.

The improved milk meter, as described, has many advantages. The reading obtained is very accurate because the spread of milk over the conical member by the rotating cap 8 is uniform so that a fixed known ratio or proportion of milk is withdrawn to the measuring cylinder 19 under all rates of flow and under all operating conditions. The helical or inclined vanes 10 on the stem 9 of the cap cause thorough mixing of the incoming milk and, as the rotation of the cap causes continuous change of position of the lower edge or lip 11 distributing the milk onto the conical member, any asymmetry or damage to the cap will have negligible effect on the representative sample withdrawn into the measuring cylinder 19.

Refinements may be made within the ambit of the invention. One of these, of course, is the clamping of the bowl 4 onto the sealing ring 5 in the base member 2 by means of the pivoted clamping yoke 6, as previously described, so that the bowl can be readily removed for cleaning or access to the conical member 12 and sample collecting chamber 15. The base member 2 may also have an annular concave or undercut portion 23 surrounding the lower edge of the conical member to prevent any upsurge of milk onto the bowl likely to obscure view of the milk flow down the conical member and also to prevent any possibility of the milk splashing over the vertical walls 16 of the sample collecting chamber at the lower end of the conical member.

Appropriate means may also be provided to permit washing of the milk chamber 3 and the measuring cylinder 19 by circulation of detergent or washing solutions therethrough.

The complete meter may be supported by adjustable supporting means as 24 and a suitable plumb bob device as 25 provided to facilitate correct levelling of the meter so that accurate reading of the sample of milk in the measuring cylinder 19 can be obtained.

The measuring cylinder 19 and its associated parts can also be made readily removable by means of a disconnectible joint 26 and a readily disconnectible coupling 27.

I claim:
1. Milk meter for milking machines comprising a base member supporting a housing; a milk inlet conduit extending upwardly through said base member into said housing; a guide member arranged within the housing around the milk inlet conduit and having a downwardly diverging surface surrounding said milk inlet conduit; a cap rotatable on the upper end of the inlet conduit and having a wall portion extending downwardly toward said surface of said guide member to distribute the milk in a uniform descending curtain over said surface of said guide member; wall means defining a sector-shaped chamber at the lower end of said guide member and collecting a fixed and known ratio or proportion of the milk descending over said guide member surface; and measuring means for measuring the quantity of milk collected in said chamber.

2. Milk meter as claimed in claim 1; and further comprising vane means on said cap arranged in the path of milk flowing into said housing through said conduit, and constructed and arranged for imparting rotation to said cap in response to impingement of milk upon said vane means.

3. Milk meter as claimed in claim 1, said cap having a downwardly extending stem slidable in the inlet conduit.

4. Milk meter as claimed in claim 1, wherein said wall portion has a lower edge positioned for distributing the milk uniformly over said surface of said guide member.

5. Milk meter as claimed in claim 1, said cap being slidable axially with reference to said conduit, and said housing comprising a housing portion above and normally spaced from said cap but positioned to be engaged by the latter when said cap slides axially in response to inflow of milk through said conduit, whereby said cap during its rotation strikes said housing portion to give an audible indication that milking rate of flow is taking place.

6. Milk meter as claimed in claim 1, wherein said wall means comprises closely spaced vertical walls constituting the lateral limits of said sector-shaped chamber.

7. Milk meter as claimed in claim 1, wherein the measuring means for measuring the quantity of milk collected in said chamber comprise a tube communicating with said sector-shaped chamber and through a sampling cock with a transparent graduated measuring cylinder.

8. Milk meter as claimed in claim 7 further comprising means for withdrawing the milk from said measuring cylinder.

9. Milk meter as claimed in claim 7 wherein said measuring cylinder has a draw-off tap at its lower end.

10. Milk meter as claimed in claim 9, wherein said draw-off tap comprises a pair of passages communicating with said inlet conduit and the exterior of said cylinder, and valve means for selectively connecting the interior of said cylinder with the respective passages for enabling withdrawal of milk from the measuring cylinder for testing and for return to the milk inlet conduit, respectively.

11. Milk meter as claimed in claim 1, said housing having the shape of an inverted bowl, and said base member having a resilient sealing ring against which the lower edge of said housing is sealingly clamped.

12. Milk meter as claimed in claim 11, wherein said clamping means comprise a yoke pivoted to said base member and a clamping screw carried by said yoke and engageable with the top of said housing.

13. Milk meter as claimed in claim 1, said guide member being a conical member, and said base member having an annular portion surrounding the lower edge of said conical member to prevent upsurge of milk onto said housing and splashing of milk into the sector-shaped collecting chamber.

References Cited

UNITED STATES PATENTS

| | | | |
|---|---|---|---|
| 3,241,372 | 3/1966 | Maxwell | 73—422 |
| 3,349,617 | 10/1967 | Hartstone | 73—202 |
| 3,349,618 | 10/1967 | Maxwell | 73—202 |

JAMES J. GILL, Primary Examiner